(12) United States Patent
Girouard

(10) Patent No.: US 11,168,798 B2
(45) Date of Patent: Nov. 9, 2021

(54) PRESSURE-BALANCED VALVE

(71) Applicant: EMCARA GAS DEVELOPMENT INC., Guelph (CA)

(72) Inventor: Erick Girouard, Guelph (CA)

(73) Assignee: Emcara Gas Development Inc., Guelph (CA)

(*) Notice: Subject to any disclaimer, the term of this patent is extended or adjusted under 35 U.S.C. 154(b) by 54 days.

(21) Appl. No.: 14/976,465

(22) Filed: Dec. 21, 2015

(65) Prior Publication Data
US 2016/0215894 A1 Jul. 28, 2016

Related U.S. Application Data

(60) Provisional application No. 62/095,343, filed on Dec. 22, 2014.

(51) Int. Cl.
*F16K 11/10* (2006.01)
*F16K 11/07* (2006.01)

(52) U.S. Cl.
CPC ............ *F16K 11/105* (2013.01); *F16K 11/07* (2013.01)

(58) Field of Classification Search
CPC ......... Y10T 137/7737; Y10T 137/7847; Y10T 137/87829; Y10T 137/87877; Y10T 137/7841; Y10T 137/2574; Y10T 137/87177; F16K 11/105; F16K 11/07
See application file for complete search history.

(56) References Cited

U.S. PATENT DOCUMENTS

| 2,480,712 | A | | 8/1949 | Carbon | |
|---|---|---|---|---|---|
| 3,967,635 | A | * | 7/1976 | Sealfon | B01F 3/04815 137/102 |
| 4,245,465 | A | * | 1/1981 | Milo | F16N 27/00 184/6.11 |
| 4,452,037 | A | * | 6/1984 | Waddington | F01D 25/18 184/6.11 |

(Continued)

FOREIGN PATENT DOCUMENTS

| EP | 0 188 048 A1 | 7/1986 |
|---|---|---|
| EP | 2 511 579 A1 | 10/2012 |

(Continued)

OTHER PUBLICATIONS

Machine Translation of FR864706A retrieved from espacenet.com on Jul. 6, 2020. (Year: 2020).*

(Continued)

*Primary Examiner* — Jessica Cahill
(74) *Attorney, Agent, or Firm* — Ohlandt, Greeley, Ruggiero & Perle, L.L.P.

(57) ABSTRACT

There is provided a valve apparatus. The valve apparatus includes a body, a closure member, upstream and downstream compartments, a closure member passage, a first fluid pressure-receiving surface fraction and a second fluid pressure-receiving surface fraction. The body includes an inlet port, a first outlet port, and a second outlet port. The closure member is configured for movement between an open position and a closed position. In the open position, the first outlet port is open. In the closed position, the first outlet port is closed. While the fluid pressure within an upstream compartment is equal to the fluid pressure within a downstream compartment, the closure member is biased to the closed position.

25 Claims, 9 Drawing Sheets

(56) References Cited

U.S. PATENT DOCUMENTS

| | | | | |
|---|---|---|---|---|
| 6,257,268 B1 * | 7/2001 | Hope | ............... | G05D 16/103 |
| | | | | 137/112 |
| 6,779,543 B2 * | 8/2004 | Hollister | ............. | E21B 34/02 |
| | | | | 137/102 |
| 8,596,417 B2 * | 12/2013 | Barrett | ................. | F02C 7/06 |
| | | | | 184/6.11 |
| 9,097,358 B2 * | 8/2015 | Girouard | ............ | F16K 17/38 |
| 9,121,521 B2 * | 9/2015 | Girouard | ........... | F16K 31/002 |
| 9,188,031 B2 * | 11/2015 | Hoji | ..................... | F01M 1/16 |
| 2005/0279411 A1 * | 12/2005 | Wang | ................. | F16K 11/105 |
| | | | | 137/512.2 |
| 2010/0213010 A1 | 8/2010 | Cornet et al. | | |
| 2013/0205745 A1 * | 8/2013 | Detry | .................. | F01D 25/20 |
| | | | | 60/39.08 |
| 2015/0000748 A1 * | 1/2015 | Shelcoviz | ....... | F16K 37/0075 |
| | | | | 137/1 |

FOREIGN PATENT DOCUMENTS

| | | | | |
|---|---|---|---|---|
| FR | 864706 A * | 5/1941 | ......... | G05D 16/166 |
| FR | 2 437 553 A1 | 4/1980 | | |
| FR | 2 537 689 A1 | 6/1984 | | |
| FR | 3 013 098 A1 | 5/2015 | | |
| GB | 589095 A * | 6/1947 | ............ | F15B 1/027 |

OTHER PUBLICATIONS

Machine Translation of FR2437553 related application EP0010465A2 retrieved Jan. 21, 2021 (Year: 2021).*
WIPO, International Search Report and Written Opinion for PCT Application No. PCT/CA2016/000155 dated Jan. 25, 2017.
Extended European Search Report dated Dec. 17, 2019 from corresponding European Patent Application No. 16902616.8, 7 pages.
Brazilian Office Action dated May 12, 2020 from corresponding Brazilian Patent Application No. BR112018074193-0, 7 pages.
European Exam Report dated Oct. 30, 2020 from corresponding European Patent Application No. 16902616.8, 7 pages.

* cited by examiner

PRESSURE-BALANCED VALVE

FIELD

The present disclosure relates to valves having closure members whose position is governed by fluid pressure.

BACKGROUND

Thermally actuated valves are designed for enabling conduction of fluids from a source in response to sensing of high temperature conditions. In this way, fluid may be conducted away from such high temperature conditions (which may be realized during upset conditions, such as a fire), so as to prevent exposure of the fluid to the high temperature conditions, which may result in a safety hazard.

Existing thermally actuated valves are not typically designed to enable such conduction of fluids at high flow-rates, and it is desirable to provide an apparatus, which works with thermally actuated valves, or other kinds of actuators, to enable acceptable rates of fluid flow in response to a triggering event.

SUMMARY

In one aspect, there is provided a valve apparatus comprising: a body including an inlet port, a first outlet port, and a second outlet port, and a fluid passage network extending between the inlet port and the first and second outlet ports; a closure member configured for movement between an open position and a closed position, wherein, in the open position, the first outlet port is open, and wherein, in the closed position, the first outlet port is closed; an upstream compartment, disposed between the inlet port and the closure member; a downstream compartment, disposed between the second outlet port and the closure member; wherein the upstream and downstream compartments are established by the positioning of the closure member relative to the body; a closure member passage extending through the closure member for effecting fluid communication between the upstream and downstream compartments; a first fluid pressure-receiving surface fraction defined on the closure member and configured for receiving forces being applied by fluid disposed within the upstream compartment; and a second fluid pressure-receiving surface fraction defined on the closure member and configured for receiving forces being applied by fluid disposed within the downstream compartment; wherein the first and second fluid pressure-receiving surface fractions are co-operatively configured such that, while the fluid pressure within the upstream compartment is equal to the fluid pressure within the downstream compartment, the closure member is biased to the closed position.

In another aspect, there is provided a valve apparatus comprising: a body including an inlet port, a first outlet port, and a second outlet port, and a fluid passage network extending between the inlet port and the first and second outlet ports; a closure member configured for movement between an open position and a closed position, wherein, in the open position, the first outlet port is open, and wherein, in the closed position, the first outlet port is closed; an upstream compartment, disposed between the inlet port and the closure member; a downstream compartment, disposed between the second outlet port and the closure member; wherein the upstream and downstream compartments are established by the positioning of the closure member relative to the body; a closure member passage extending through the closure member for effecting fluid communication between the upstream and downstream compartments; a first fluid pressure-receiving surface fraction defined on the closure member and configured for receiving forces being applied by fluid disposed within the upstream compartment; a second fluid pressure-receiving surface fraction defined on the closure member and configured for receiving forces being applied by fluid disposed within the downstream compartment; and a retractable detent member configured for movement between an interference fit position and a retracted portion, wherein, in the interference fit position, the retractable detent member is disposed in an interference fit relationship with the closure member for interfering with movement of the closure member from the closed position to the open position, and wherein, in the retracted position, the closure member becomes moveable to the open position, and wherein the retractable detent member is configured to retract from the interference fit position in response to application of a minimum valve opening force to the closure member.

In another aspect, there is provided an assembly comprising: a first valve apparatus including either one of the valve apparatuses as described above; and a second valve apparatus including: an inlet port fluid coupled to the second outlet port of the first valve apparatus; an outlet port; a fluid passage extending from the inlet port to the outlet port; a closure member moveable between a closed position and an open position, wherein, in the closed position, fluid communication between the inlet port and the outlet port is sealed or substantially sealed; and wherein, in the open position, fluid communication is effected between the inlet port and the outlet port; and an actuator for actuating movement of the closure member from the closed position to the open position in response to a predetermined condition.

In a further aspect, there is provided a kit for constructing the valve assembly, as described above, comprising a first valve apparatus, as described above, and a second valve apparatus including: an inlet port configured for fluid coupling to the second outlet port of the first valve apparatus; an outlet port; a fluid passage extending from the inlet port to the outlet port; a closure member moveable between a closed position and an open position, wherein, in the closed position, fluid communication between the inlet port and the outlet port is sealed or substantially sealed; and wherein, in the open position, fluid communication is effected between the inlet port and the outlet port; and an actuator for actuating movement of the closure member from the closed position to the open position in response to a predetermined condition.

BRIEF DESCRIPTION OF DRAWINGS

The preferred embodiments will now be described with the following accompanying drawings, in which.

DETAILED DESCRIPTION

Figure 1:
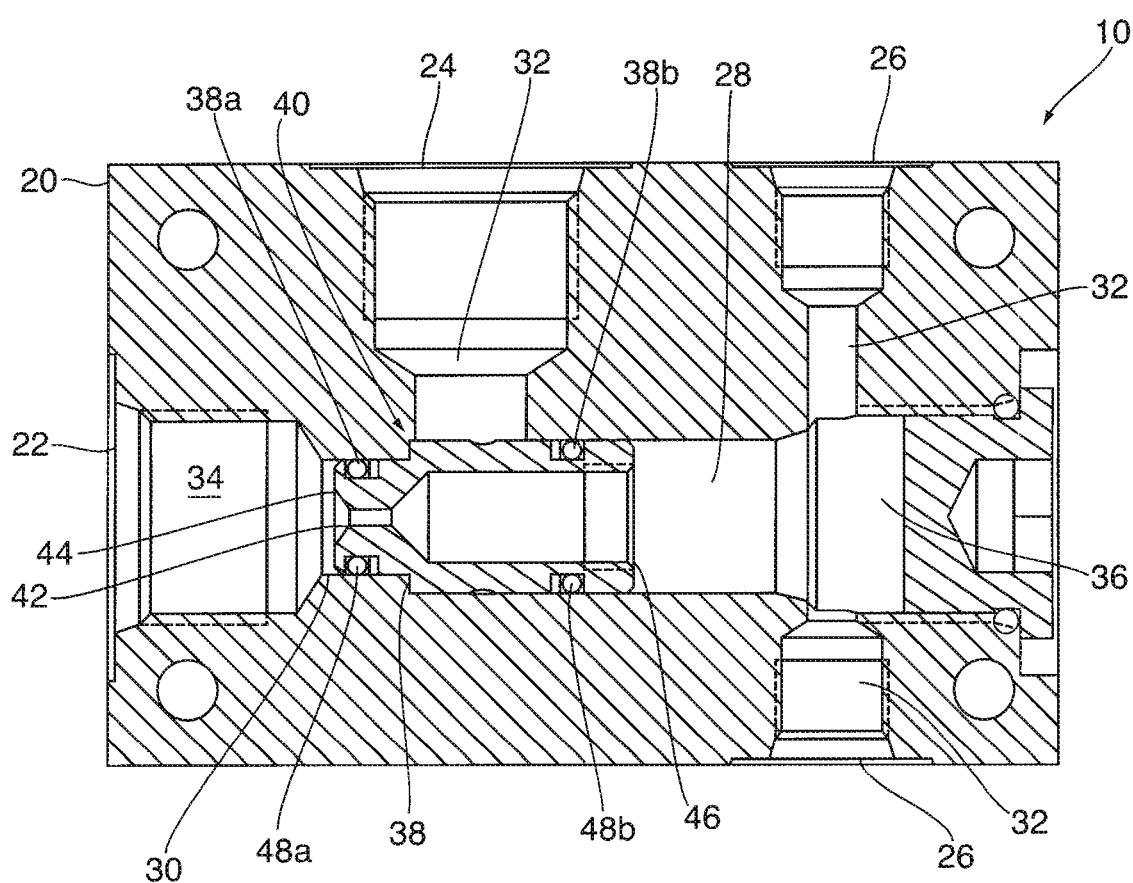
FIG. 1 is a sectional side elevation view of an embodiment of the valve apparatus, illustrating the closure member in the closed position.

Referring to FIGS. 1 to 4, there is provided a valve apparatus 10 including a body 20 and closure member 40.

The body 20 includes an inlet port 22, a first outlet port 24, and a second outlet port 26, and a fluid passage network 28 extending between the inlet port 22 and the first and second outlet ports 24, 26. In some embodiments, for example, the fluid passage network 28 includes a fluid passage portion 30 and a plurality of fluid passage branches 32 extending from the fluid passage portion 30.

Figure 2:
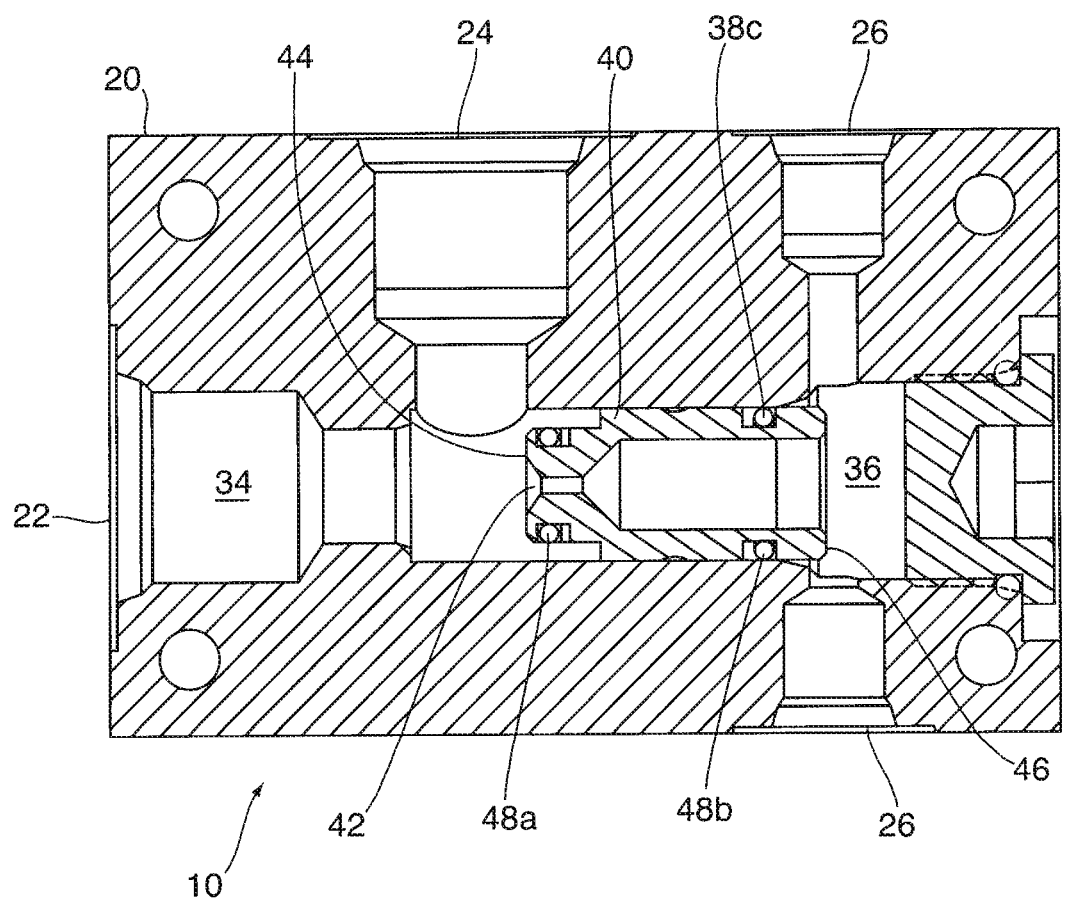
FIG. 2 is a sectional side elevation view of the valve apparatus of FIG. 1, illustrating the closure member in the open position.

The closure member 40 is configured for movement between a closed position (see FIG. 1) and a open position (see FIG. 2). In some embodiments, for example, the closure member 40 is moveable within the fluid passage network 28. In the open position, the first outlet port 24 is open. In the closed position, the first outlet port 24 is closed. In some embodiments, for example, while the first outlet port 24 is disposed in the open condition, fluid communication is effected between the inlet port 22 and the first outlet port 24, and while the first outlet port 24 is disposed in the closed condition, fluid communication between the inlet port 22 and the first outlet port 24 is sealed or substantially sealed.

An upstream compartment 34 is disposed between the inlet port 22 and the closure member 40. A downstream compartment 36 is disposed between the second outlet port 26 and the closure member 40. The upstream and downstream compartments 34, 36 are established by the positioning of the closure member 40 relative to the body 20. In this respect, the space occupied by each one of the upstream and downstream compartment changes 34, 36 as the closure member 40 moves between the open and closed positions.

A closure member passage 42 extends through the closure member 40 for effecting fluid communication between the upstream and downstream compartments 34, 36. In some embodiments, for example, the fluid communication between the upstream and downstream compartments 34, 36 is effected unconditionally (i.e. independently of any fluid pressure differential between the upstream and downstream compartments 34, 36, or independently of the state of a valve device (such as a check valve) that may be disposed within the closure member passage 42 for selectively opening and closing the closure member passage 42).

A first fluid pressure-receiving surface fraction 44 is defined on the closure member 40, and is configured for receiving forces being applied by fluid disposed within the upstream compartment 34. A second fluid pressure-receiving surface fraction 46 is defined on the closure member 40, and is configured for receiving forces being applied by fluid disposed within the downstream compartment 36. In one aspect, the first and second fluid pressure-receiving surface fractions 44, 46 are co-operatively configured such that, while the fluid pressure within the upstream compartment 34 is equal to the fluid pressure within the downstream compartment 36, the closure member 40 is biased to the closed position.

In some embodiments, for example, the closure member 40 is configured for movement from the open position to the closed position in response to application of a force, to the closure member 40, urging the opening of the first outlet port 24, that exceeds a force, applied to the closure member 40, urging the closing of the first outlet port 24. In some of these embodiments, for example, the force urging the opening of the first outlet port 24 is being applied by fluid disposed within the upstream compartment 34, and the force urging the closing of the first outlet port 24 is being applied by fluid disposed within the downstream compartment 36. In some of these embodiments, for example, the force, being applied to the closure member 40, urging the opening of the first outlet port 24, exceeds the force being applied to the closure member 40, urging the closing of the first outlet port 24, by at least 10%, such as, for example, at least 25%, such as, for example, at least 50%, such as, for example, at least 100%.

In some embodiments, for example, the closure member passage 42 is configured for conducting fluid from the upstream compartment 34 to the downstream compartment 36, in response to a pressure differential between the upstream compartment 34 and the downstream compartment 36, at a rate sufficient such that, while the closure member 40 is disposed in the closed position, and the pressure differential between the upstream compartment 34 and the downstream compartment 36 is increasing at a rate that is less than a minimum predetermined rate (such as, for example, 3.3 psi per second), insufficient force is being applied by fluid disposed within the upstream compartment 34 for urging the closure member 40 to the open position. In some of these embodiments, for example, the closure member passage 42 is configured to flow fluid from the upstream compartment 34 to the downstream compartment 36, in response to a pressure differential between the upstream compartment 34 and the downstream compartment 36, at a rate sufficient such that, while the closure member 40 is disposed in the closed position, and the pressure differential between the upstream compartment 34 and the downstream compartment 36 is increasing at a rate that is less than a minimum predetermined rate (such as, for example, 3.3 psi per second), the closure member 40 remains disposed in the closed position.

In some embodiments, for example, the closure member 40 is sealingly engaged to the body 20, and the sealing engagement is such that, amongst other things, fluid flow between the upstream and downstream compartments 34, 36 is directed through the closure member passage 42.

In some embodiments, for example, the sealing engagement is such that, while the closure member 40 is disposed in the closed position, (i) fluid flow, between the closure member 40 and the body 20, from the upstream compartment 34 to the first outlet port 24, is prevented or substantially prevented, and (ii) fluid flow, between the closure member 40 and the body 20, from the downstream compartment 36 to the first outlet port 24, is prevented or substantially prevented. In some embodiments, for example, the sealing engagement is such that, while the closure member 40 is disposed in the open position, fluid flow, between the closure member 40 and the body 20, from the downstream compartment 36 to the first outlet port 24, is prevented or substantially prevented.

In some embodiments, for example, the prevention or substantial prevention of fluid flow, between the closure member 40 and the body 20, from the upstream compartment 34 to the first outlet port 24, is effected by a first sealing member 48*a*. In some of these embodiments, for example, while the closure member 40 is disposed in the closed position, the first sealing member 48*a* is disposed between the inlet port 22 and the first outlet port 24.

In some embodiments, for example, the prevention or substantial prevention of fluid flow, between the closure member 40 and the body 20, from the downstream compartment 36 to the first outlet port 24, is effected by a second sealing member 48*b*. In some of these embodiments, for example, while the closure member 40 is disposed in either one of the open position or the closed position, the second sealing member 48*b* is disposed between the second outlet port 26 and the first outlet port 24.

In some embodiments, for example, the closure member 40 includes the first and second sealing members 48*a*, 48*b*. In some of these embodiments, for example, the closure member 40 carries the first and second sealing members 48*a*, 48*b*. Exemplary sealing members 48*a*, 48*b* include o-rings.

In some embodiments, for example, the first fluid pressure-receiving surface fraction 44 is defined as that surface fraction of the closure member 40 disposed upstream of the first sealing member 48*a*, and the second fluid pressure-receiving surface fraction 46 is defined as that surface fraction of the closure member 40 disposed downstream of the second sealing member 48*b*. The total surface area of the second fluid pressure-receiving surface fraction 44 exceeds the total surface area of the first fluid pressure-receiving surface fraction 46. In some of these embodiments, for example, the total surface area of the second fluid pressure-receiving surface fraction 46 exceeds the total surface area of the first fluid pressure-receiving surface fraction 44 by at least 20%, such as, for example, by at least 50%. In some embodiments, for example, the total surface of the surface fraction 46 exceeds the total surface area of the surface fraction 44 by between 50% and 150%.

As described above, in some embodiments, for example, the movement of the closure member 40 between the open position and the closed position is effected within the fluid passage network 28, and the closure member 40 is moveable through a fluid passage portion 30 of the fluid passage network 28. In this respect, in some embodiments, for example, the valve apparatus 10 further comprises a passage-defining surface 38 defined within the body 20. The passage-defining surface 38 is co-operatively configured with the closure member 40 such that, when the closure member 40 is disposed in the closed position: (i) the first sealing member 48*a* sealingly engages an upstream surface portion 38*a* of the passage-defining surface 38 of the body 20 for preventing, or substantially preventing, fluid flow, between the closure member 40 and the body 20, from the upstream compartment 34 to the first outlet, and (ii) the second sealing member 48*b* sealingly engages a first downstream surface portion 38*b* of the passage-defining surface 38 of the body 20 for preventing, or substantially preventing, fluid flow, between the closure member 40 and the body 20, from the first downstream compartment 36 to the first outlet port 24. In this respect, when the closure member 40 is disposed in the closed position, fluid flow, between the closure member 40 and the body 20, from both of the upstream and downstream compartments 34, 36, independently, to the first outlet port 24, is prevented or substantially prevented. The cross-sectional area of the fluid passage portion 30 at the downstream surface portion 38*b* is greater than the cross-sectional area of the fluid passage 30 portion at the upstream surface portion 38*a*.

In some embodiments, for example, the passage-defining surface 38 is further co-operatively configured with the closure member 40 such that, when the closure member 40 is disposed in the open position (see FIG. 2): (i) the first sealing member 48*a* is spaced apart from the passage-defining surface 38 of the body 20 such that a flow path is established between the inlet port 22 and the first outlet port 24, and (ii) the second sealing member 48*b* sealingly engages a second downstream surface portion 38*c* of the passage-defining surface 38 of the body 20 for preventing, or substantially preventing, fluid flow, between the closure member 40 and the body 20, from the downstream compartment 36 to the first outlet port 24. In this respect, with respect to the first sealing member 48*a*, in moving from the open to the closed position, the first sealing member 48*a* is moved to a location within the fluid passage portion 30 having an enlarged cross-sectional area relative to the cross-sectional area at the upstream surface portion 38*b*, such that the sealing engagement of the first sealing member 48*a* to the passage-defining surface 38 is suspended. In some embodiments, for example, with respect to the second sealing member 48*b*, in moving from the open to the closed position, the second sealing member 48*b* continues to sealingly engage the passage-defining surface 38.

In some embodiments, for example, the axis of the inlet port 22 is aligned, or substantially aligned, with the fluid passage portion 30 through which the closure member 40 is moveable. This allows fluid from inlet port 22 to flow efficiently to fluid passage portion 30, with limited pressure loss.

Figure 3:
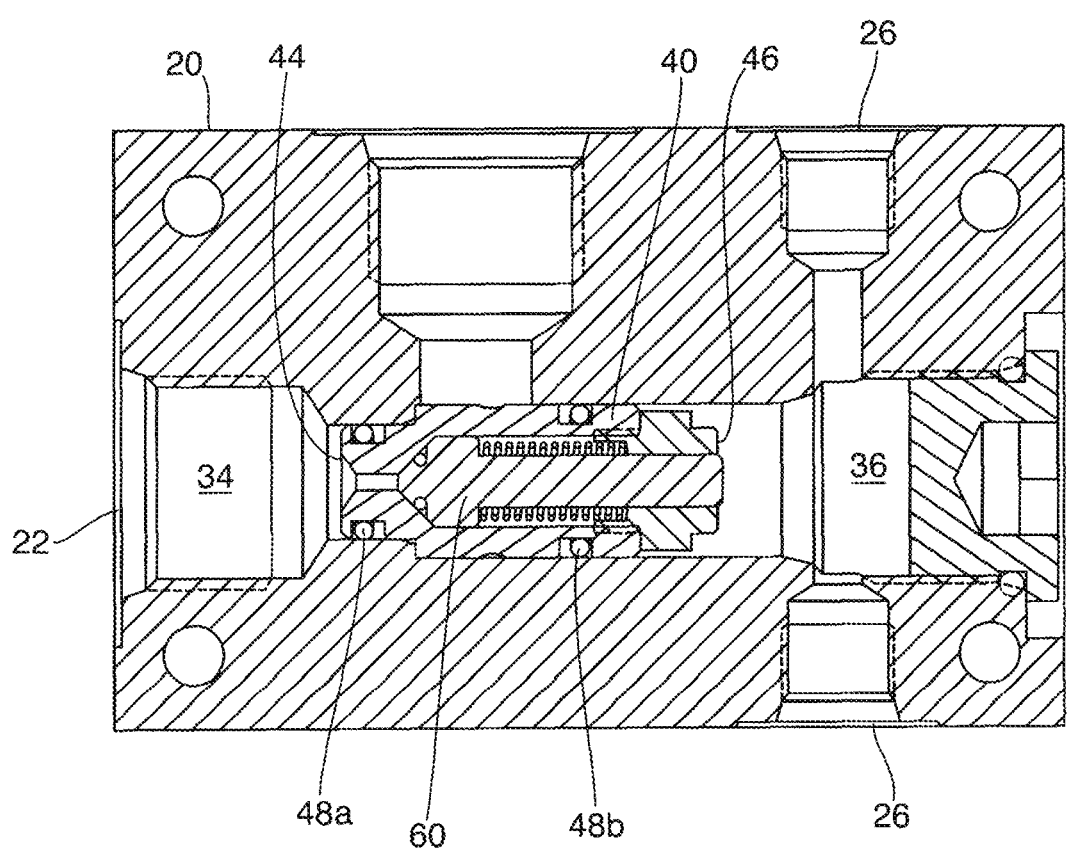
FIG. 3 is a sectional side elevation view of another embodiment of the valve apparatus, illustrating the closure member in the closed position.

Referring to FIG. 3, in another aspect, for example, the valve apparatus 10 further includes a one-way valve 60 disposed within the closure member passage 42. The one-way valve 60 is configured for preventing, or substantially preventing, fluid flow, through the closure member passage 42, from the downstream compartment 36 to the upstream compartment 34. In some embodiments, for example, the one-way valve 60 includes a check valve.

Figure 4:
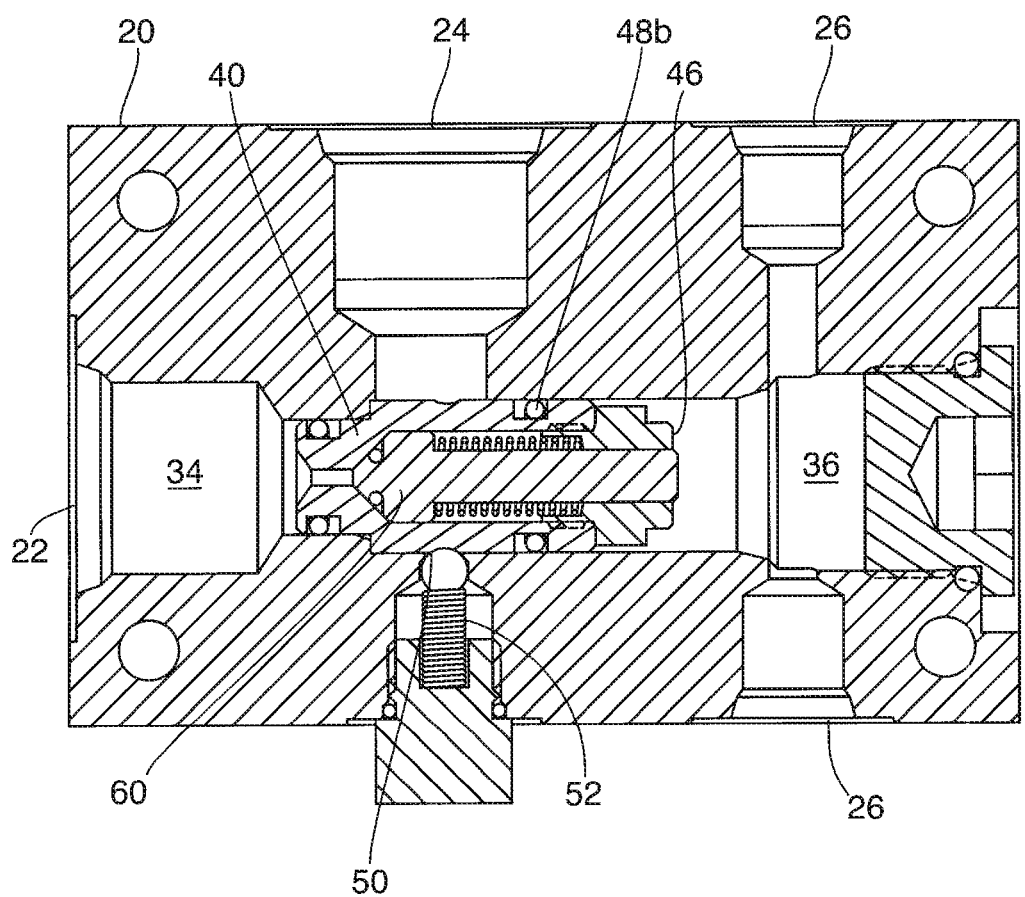
FIG. 4 is a sectional side elevation view of a further embodiment of the valve apparatus, illustrating the closure member in the closed position.

Referring to FIG. 4, in another aspect, for example, the valve apparatus 10 further includes a retractable detent member 50. The retractable detent member 50 is configured for movement between an interference fit position and a retracted portion. In the interference fit position, the retractable detent member 50 is disposed in an interference fit relationship with the closure member 40 for interfering with movement of the closure member 40 from the closed position to the open position. In the retracted position, the closure member 40 becomes moveable to the open position. The retractable detent member 50 is configured to retract from the interference fit position in response to application of a minimum valve opening force to the closure member 40. In some embodiments, for example, the retractable detent member 50 is disposed for movement within a compartment 52 of the body 20. In some embodiments, for example, the retractable detent member 50 includes a ball detent which is biased to the interference fit position by a biasing member 54, such as a resilient member, such as a spring In some embodiments, for example, the valve apparatus 10 is configured for regulating the flow of gaseous material between the inlet port 20 and outlet ports 24,26.

Figure 5:
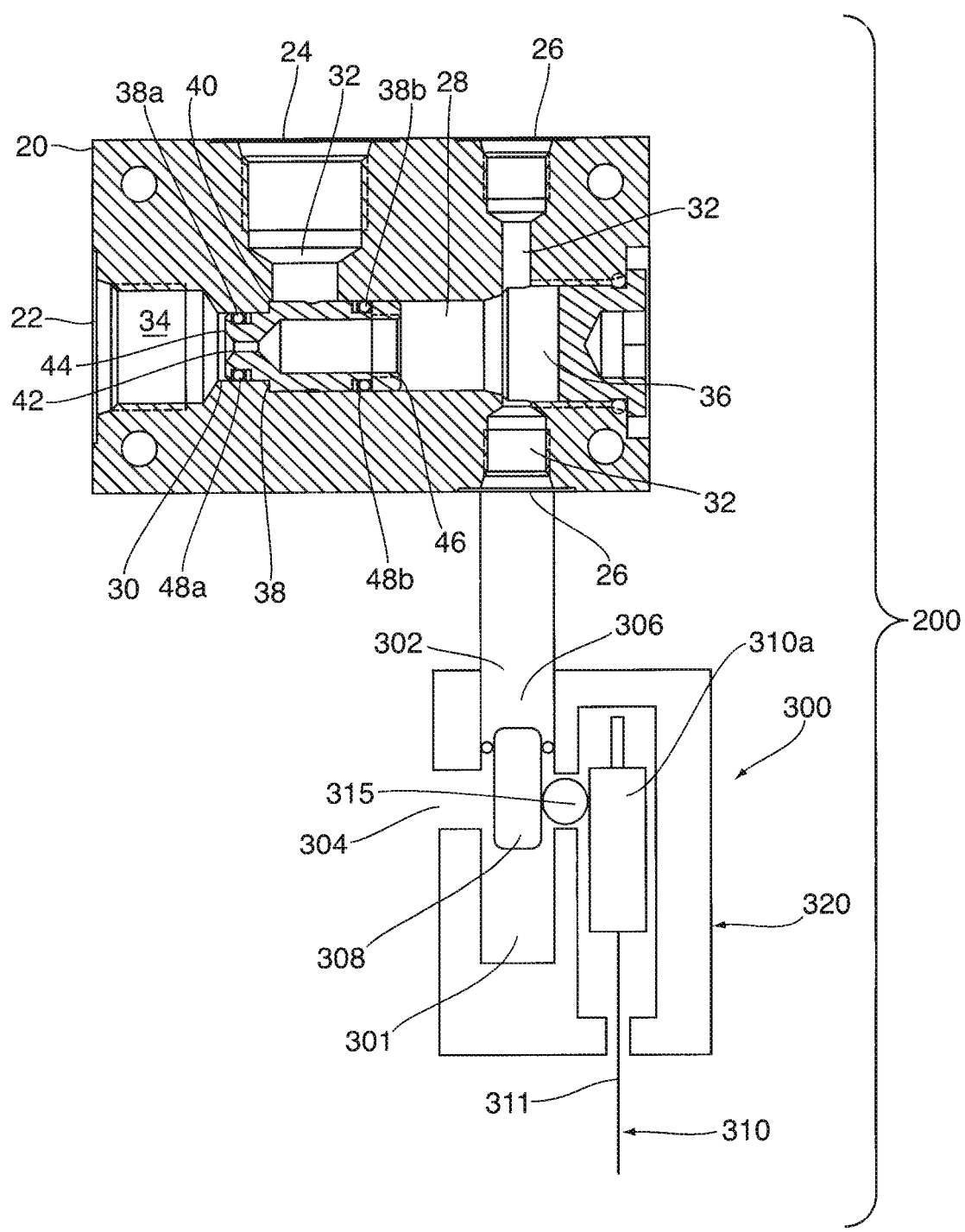
FIG. 5 is a schematic illustration of an assembly of a valve apparatus of FIG. 1 and a second valve apparatus, with the closure member of the second valve apparatus disposed in the closed position.
Figure 6:
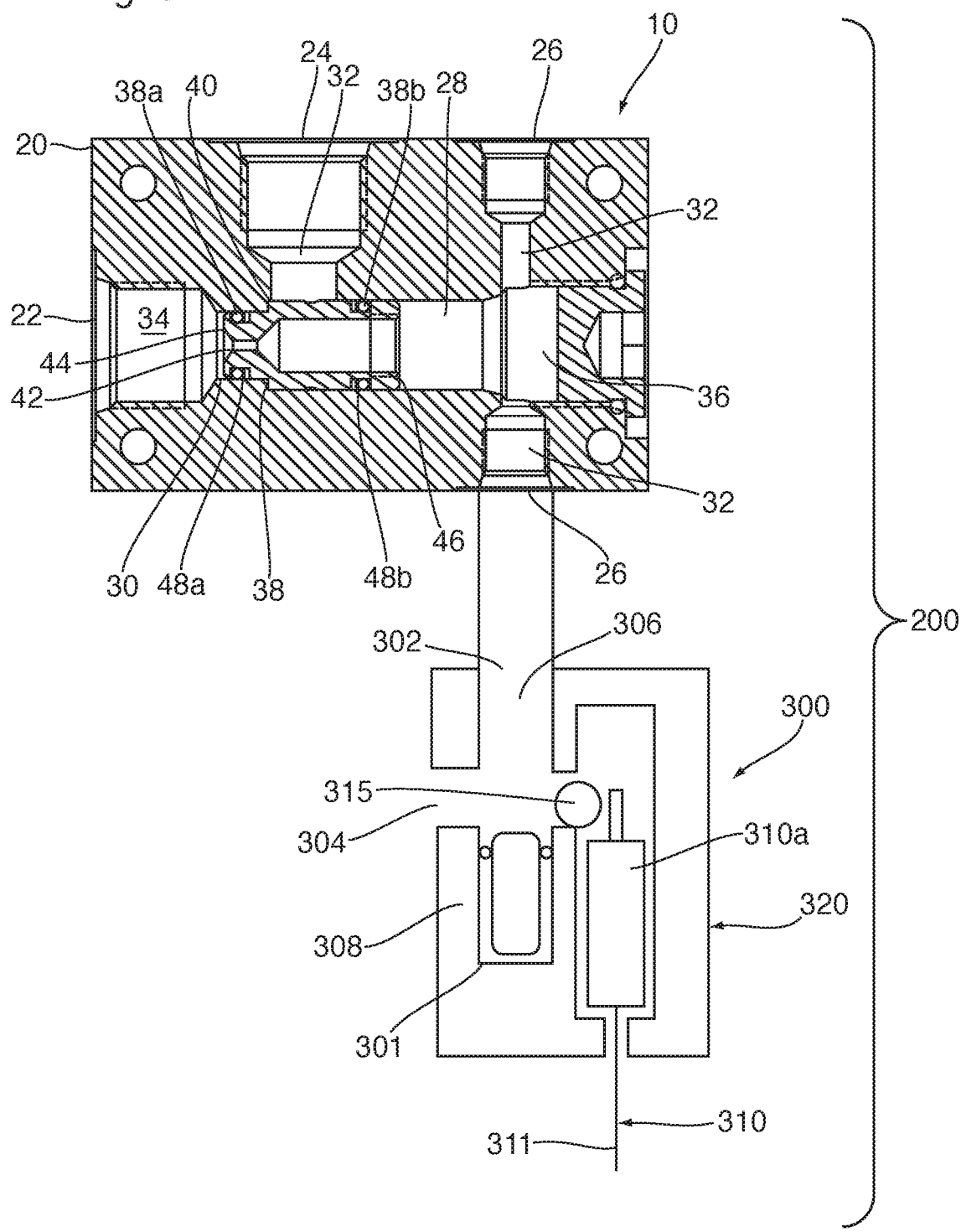
FIG. 6 is a schematic illustration of the assembly of FIG. 5, with the closure member of the second valve apparatus disposed in the open position.

Referring to FIG. 5, in another aspect, any one of the embodiments of the valve apparatus 10, described above, is incorporated within an assembly 100 for effecting the venting of gaseous material that is contained within a gaseous material supply source, such as a tank 200 (see FIG. 6). In this respect, such valve apparatus 10 (hereinafter, the "first valve apparatus 10") is combined with a second valve apparatus 300 within such an assembly. In this respect, the assembly 100 includes the first valve apparatus 10 and the second valve apparatus 300.

The second valve apparatus 300 includes an inlet port 302, an outlet port 304, a discharge fluid passage 306, and a closure member 308. The inlet port 302 is fluidly coupled to the second outlet port 26 of the first valve apparatus 10. The outlet port 304 of the second valve apparatus is configured for venting received gaseous material to the immediate environment (for example, the atmosphere).

The closure member 308 is moveable between a closed position and an open position. In the closed position, fluid communication between the inlet port 302 and the outlet port 304 is sealed or substantially sealed. In the open position, fluid communication is effected between the inlet port and the outlet port 304. The discharge fluid passage 306 extends from the inlet port 302 to the outlet port 304 for effecting fluid communication between the inlet and outlet ports 302, 304 when the closure member 308 is disposed in the open position.

The second valve apparatus 300 further includes an actuator 310 for actuating movement of the closure member 308 from the closed position to the open position in response to a predetermined condition. In some embodiments, for example, the predetermined condition is a predetermined minimum temperature, such that the second valve apparatus 300 includes a thermally actuated valve. Exemplary thermally actuated valves are described and illustrated in U.S. Patent Publication No 2012/0199764. When the second valve apparatus 300 is a thermally actuated valve, in some of these embodiments, for example, the actuator 310 includes a temperature responsive portion 311, such as, for example, a shape memory alloy. In some embodiments, for example, the temperature responsive portion 311 is in the form of a wire 311.

In some embodiments, for example, the actuator 310 includes a displaceable interference-effecting portion 310a. The displaceable interference-effecting portion 310a is configured for displacement between an interference position (see FIG. 5) and a non-interference position (see FIG. 6). In the interference position, the displaceable interference-effecting portion 310a effects interference with displacement of the closure member 308 from one of the open position and the closed position (in the case of the illustrated embodiment, this is the closed position) to the other one of the open position and the closed position (in the case of the illustrated embodiment, this is the open position). In some embodiments, for example, while the displaceable interference-effecting portion 310a is in the interference position, the portion extends into the passageway 301, thereby effecting interference to the movement of the closure member 308 within the passageway 301, and thereby effecting interference with the displacement of the closure member 308. Displacement of the displaceable interference-effecting portion 310a from the interference position, as illustrated in FIG. 5, to the non-interference position, as illustrated in FIG. 6, removes the interference effected by the displaceable interference-effecting portion 310a to the movement of the actuator 310.

In some embodiments, for example, while the displaceable interference-effecting portion 310a disposed in the non-interference position, the closure member 308 is displaceable from the closed position to the open position in response to a sufficient pressure differential provided between the inlet 306 and the outlet 304 (i.e. while the displaceable interference-effecting portion 310a is disposed in the non-interference position, the closure member 308 is displaced from the closed position to the open position when the pressure differential between the inlet 306 and the outlet 304 exceeds a predetermined minimum pressure differential). In some of these embodiments, for example, the inlet 306 is disposed in fluid communication with a container 200 (such as a tank), via the first valve apparatus 10 (see FIG. 7), and is, thereby, exposed to fluid pressure within the container 200, and the outlet 304 is disposed in fluid communication with the atmosphere and is, thereby, exposed to atmospheric pressure, such that, so long as the fluid pressure within the container 200 exceeds atmospheric pressure by a predetermined minimum threshold amount, and so long as the displaceable interference-effecting portion 310a is disposed in the non-interference position, the closure member 308 will become displaced from closed position to the open position.

The actuator 310 further includes the temperature responsive portion 311. The temperature responsive portion 311 is configured to effect the displacement of the displaceable interference-effecting portion 310a (and, therefore, the actuator 310) in response to receiving of heat energy by at least a portion of the temperature responsive portion 311. In response to the receiving of heat energy, the at least a portion of the temperature responsive portion 311 effects exertion of a tensile force on the displaceable interference-effecting portion 310a, thereby effecting the displacement of the displaceable interference-effecting portion 310a, and thereby effecting removal of the interference to the displacement of the closure member 308, such that the closure member 308 becomes displaceable, from one of the open position and the closed position to the other one of the open position and the closed position, in response to a pressure differential, existing between the inlet 306 and the outlet 304, which exceeds a minimum predetermined threshold pressure differential. In some of these embodiments, for example, the receiving of heat energy by at least a portion of the temperature responsive portion 311 effects a change in shape of the at least a portion of the temperature responsive portion 311 such that the displacement of the displaceable interference-effecting portion 310a is effected. In some of these embodiments, for example, the temperature responsive portion 311 includes a longitudinal axis, and the change in shape includes a reduction in length of the temperature responsive portion 311 along its longitudinal axis.

A fire or other heat source which can effect displacement of the actuator 308, as above-described, can also effect heating of a tank to which the second valve apparatus 300 is attached. In such cases, in some embodiments, for example, the displacement of the actuator 308 is effected by the heat before the heating of the tank 200 effects the failure of the tank 200. "Failure" of the tank 200 occurs when the integrity of the tank 200 is compromised, such as by, for example, rupturing, breaking or melting.

In some embodiments, for example, the displacement of the displaceable interference-effecting portion 310a from the first position to the second position can directly effect displacement of the closure member 308, whereas in other embodiments (such as those illustrated), the displacement of the displaceable interference-effecting portion 310a from the first position to the second position indirectly effects displacement of the closure member 308. Referring to FIGS. 5 and 6, the displaceable interference-effecting portion 310a urges an intermediate member, in this case, a single ball 315, against the closure member 308 and is thereby interfering with displacement of the closure member 308 from one of the open position and the closed position (in this case, the closed position) to the other one of the open position and the closed position (in this case, the open position) by a sufficient fluid pressure differential, between the inlet 17 and the outlet 18. The ball 315 is used to transmit most of the force applied to the closure member 308, by the pressure exerted from the inlet, onto the body 320 of the valve apparatus 300, while transmitting a smaller force onto the displaceable interference-effecting portion 310a. The use of the ball 315 as an intermediate member results in less frictional resistance to the displaceable interference-effecting portion 310a when it is displaced by tensile forces exerted by a temperature responsive portion 311, compared to when there is no intermediate member and the displaceable interference-effecting portion 310a is directly engaged to the closure member 308. This allows for greater flexibility in the choice of materials for the temperature responsive portion 311, which may, for example, be a wire (for example, comprising a shaped memory alloy). For example, the material of construction of the ball 315 is steel and the diameter of the ball is 0.250 inches.

In some embodiments, the first outlet port 24 of the first valve apparatus 10 has a larger cross-sectional area than the outlet port 304 of the second valve apparatus 300. In some of these embodiments, for example, the cross-sectional area of the first outlet port 24 of the first valve apparatus 10 is larger than the cross-sectional area of the outlet port 304 of the second valve apparatus 300 by at least 200%, such as, for example at least 400%.

In some embodiments, for example, relative to a fluid passage of the second valve apparatus 300, defined by the combination of the inlet port 302, the discharge fluid passage 306, and the outlet port 304 of the second valve apparatus 300, a fluid passage of the first valve apparatus 10, defined by a combination of the inlet port 22, the closure member passage 42, and the second outlet port 26 of the first valve apparatus 10, is configured to provide greater resistance to fluid flow. Because fluid flow through the above-defined fluid passage of the second valve apparatus is relatively less impeded relative to fluid flow through the above-defined fluid passage of the first valve apparatus, upon opening of the closure member 308, fluid pressure within the downstream compartment 36 becomes substantially lower than the fluid pressure within the upstream compartment 34, such that the force of the fluid acting on the first fluid pressure-receiving surface fraction 44 is greater than the force of the fluid acting on the second fluid pressure-receiving surface fraction 46. In response, the closure member 40 moves from the open position to the closed position, and fluid flows from the upstream compartment 34 to the first outlet port 24. In this respect, the second outlet port 26 functions as a piloting port to the second valve apparatus 300, so as to enable more rapid opening of the closure member 40 of the first valve apparatus 10.

In some embodiments, for example, the cross-sectional area of the outlet port 304 of the second valve apparatus 300 is larger than the minimum cross-sectional area of the closure member passage 42 of the first valve apparatus 10.

In another aspect, for example, the assembly 100 is constructed from a kit including the first valve apparatus 10 and the second valve apparatus 300. The kit may further include instructions to effect the construction of the assembly 100.

Figure 7:
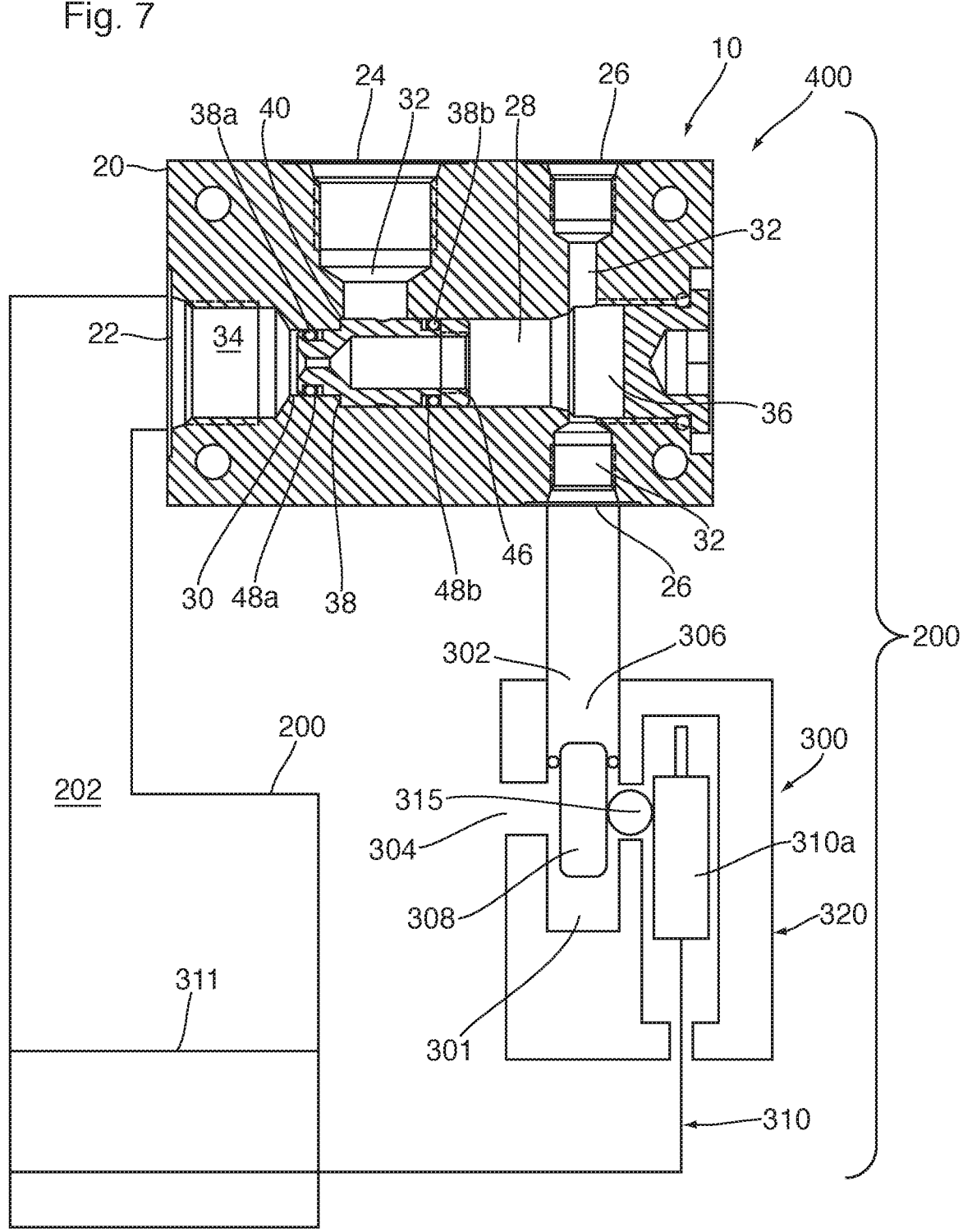
FIG. 7 is a schematic illustration of a system including a tank and the assembly illustrated in FIGS. 5 and 6.

Referring to FIG. 7, in another aspect, a system 400 is provided, and the system 400 includes a tank 200 that is fluidly coupled to any one of the embodiments of the assembly 100 described above.

The inlet port 22 of the first valve apparatus 10 of the assembly 100 is fluidly coupled to an outlet port 202 of the tank 200 for receiving gaseous material (that is contained within the tank 200) from the tank 200.

With respect to those embodiments of the system 400 where the first valve apparatus 10 includes the one-way valve 60 disposed within the closure member passage 42 (see above), in cases where the tank 200 discharges gaseous material through another outlet (such as, for example, to supply gaseous material to another receiver, such as another tank, or a unit operation) such that pressure within the tank 200 and, therefore, the upstream compartment 34, becomes reduced, by providing the one-way valve 60 within the closure member passage 42, depressurization of the downstream compartment 36 of the first valve apparatus 10 is prevented, or substantially prevented. Accordingly, after this pressure reduction, when the gaseous material within the tank 200 is replenished from a gaseous material supply source such that fluid pressure within the tank 200, and, therefore, the upstream compartment 34, becomes increased, the risk of actuating movement of the closure member 40 from the closed position to the open position, because the rate of increase in fluid pressure within the tank 200 and, therefore, the upstream fluid compartment 34, is sufficiently high such that gaseous material cannot be conducted through the closure member passage 42 to the downstream compartment 36 at a sufficient rate such that a corresponding increase in fluid pressure within the downstream compartment 36 is realized to counterbalance the increased fluid pressure within the upstream compartment 34, is mitigated. In this respect, the one-way valve 60 permits pressurizing of the tank 200 at a faster rate, without risk of inadvertently actuating opening of the closure member 40, than would be possible without the one-way valve 60.

Figure 8:
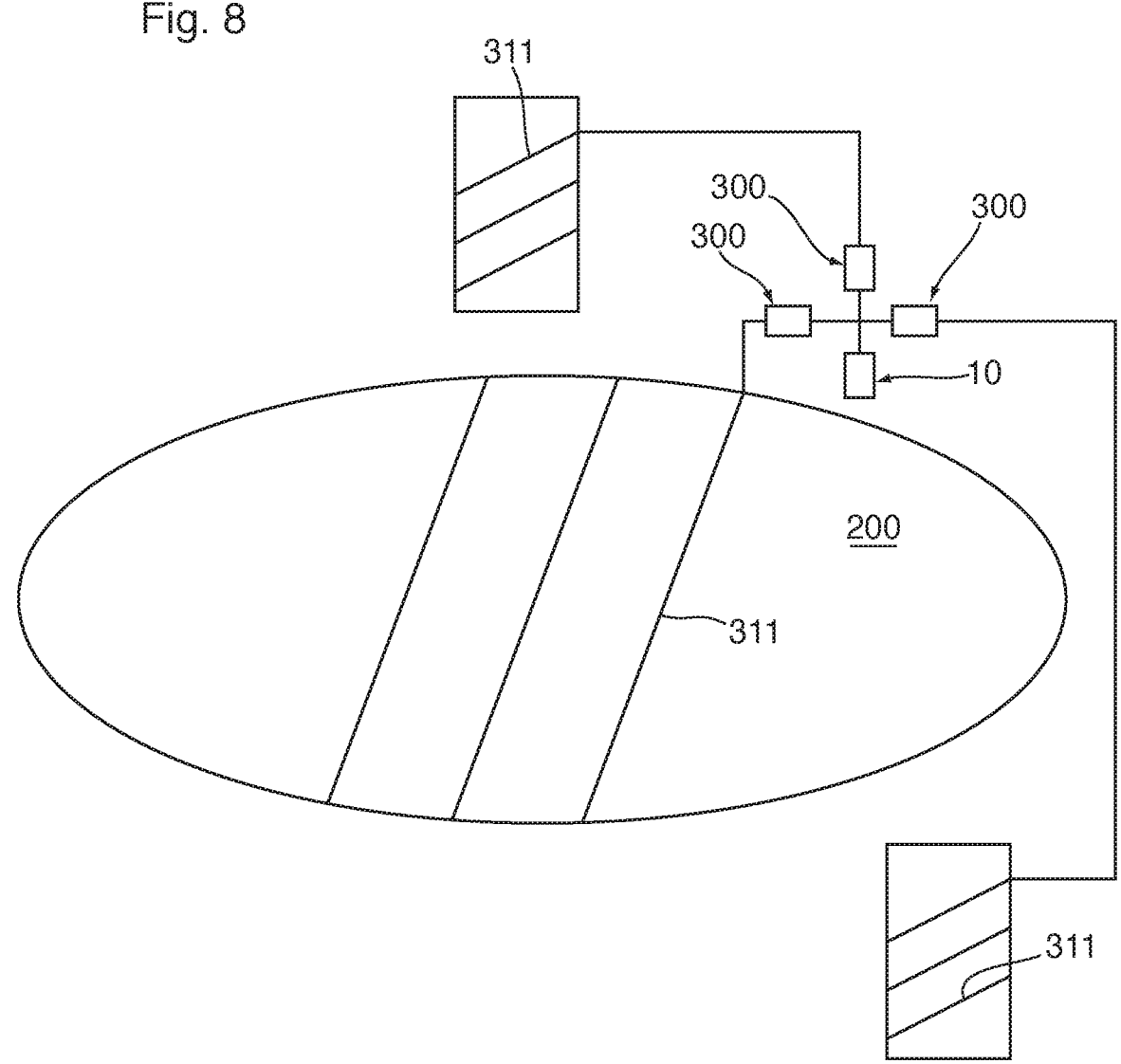
FIG. 8 is a schematic illustration of a system including a tank and an assembly of a valve apparatus of either one of FIG. 1 or 3, and two second valve apparatuses.

In some embodiments, for example, the first valve apparatus 10 includes a plurality of second outlet ports extending from the downstream compartment 36, and each one of the second outlet ports 26, independently, is fluidly coupled to a respective second valve apparatus 300. In this respect, referring to FIG. 8, in another aspect, there may be provided a system 500, and the system 500 includes a tank 200 that is fluidly coupled to the first valve apparatus 10, and each one of the second outlet ports 26 of the first valve apparatus, independently, is fluidly coupled to a respective second valve apparatus 300 (such that the system includes a plurality of second valve apparatuses). In such configuration, the tank 200 may be vented in response to a predetermined condition that effects actuation of the actuator 310 of at least one of the second valve apparatuses 300. In this respect, the second valve apparatuses 300 may be co-operatively positioned to actuate opening of the first valve apparatus 10 in response to an upset condition at any one of several different locations.

Figure 9:
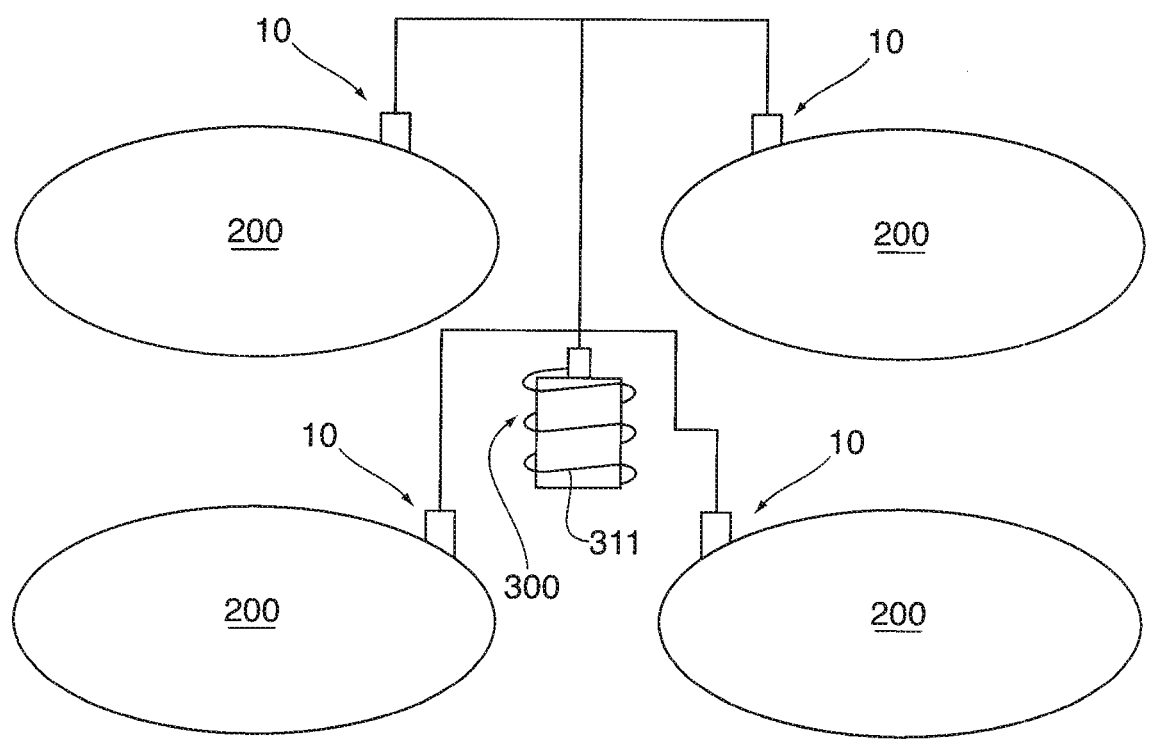
FIG. 9 is a schematic illustration of a system including four tanks and an assembly of four valve apparatus of either one of FIG. 1 or 3, each one associated with a respective one of the tanks, and a second valve apparatus.

Referring to FIG. 9, in some embodiments, for example, the system 400 includes a plurality of tanks 200, and each one of the tanks, independently, is fluidly coupled to a respective first valve apparatuses 10, such that a plurality of first valve apparatuses 10 is provided. All of the first valve apparatuses 10 are fluidly coupled to a second valve apparatus 300. In such configuration, all of the tanks 200 may be vented, simultaneously, or substantially simultaneously, in response to a predetermined condition that effects actuation of the actuator 310 of the second valve apparatuses 300. In this respect, all of the tanks are disposed for venting in response to an upset condition that effects actuation of the actuator 310 of the second valve apparatus 300.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A valve apparatus comprising:
a body including an inlet port, a first outlet port, and a second outlet port;
a closure member configured for movement between an open position and a closed position, wherein, in the open position, the first outlet port is disposed in an open condition, and wherein, while the closure member is in the closed position, fluid flow between the closure member and the body is prevented, such that the first outlet port is a closed condition;
an upstream compartment disposed between the inlet port and the closure member;
a downstream compartment disposed between the second outlet port and the closure member;
wherein the upstream and downstream compartments are established by the positioning of the closure member relative to the body;
a closure member passage extending through the closure member for effecting fluid communication between the inlet port and the second outlet port;
a one-way valve, disposed within the closure member passage, and configured for preventing, or substantially preventing, fluid flow, through the closure member passage, from the second outlet port to the inlet port;
a first fluid pressure-receiving surface fraction defined on the closure member and configured for receiving forces being applied by fluid disposed within the upstream compartment; and
a second fluid pressure-receiving surface fraction defined on the closure member and configured for receiving forces being applied by fluid disposed within the downstream compartment;
wherein:
the first and second fluid pressure-receiving surface fractions are co-operatively configured such that, while the fluid pressure within the upstream compartment is equal to the fluid pressure within the downstream compartment, the closure member is biased to the closed position;
the total surface area of the second fluid pressure-receiving surface fraction exceeds the total surface area of the first fluid pressure-receiving surface fraction; and
the closure member, the inlet port, the first outlet port, the second outlet port, and the closure member passage are co-operatively configured such that fluid communication is effected between the inlet port and the second outlet port via the closure member passage while the closure member is disposed in the open position and also while the closure member is disposed in the closed position.

2. The valve apparatus as claimed in claim 1; wherein the one-way valve includes a check valve.

3. The valve apparatus as claimed in claim 1, wherein:
the body defines a fluid passage network that extends between the inlet port, the first outlet port, and the second outlet port;
the closure member is disposed in the fluid passage network and configured for movement between the open position and the closed position while disposed in the fluid passage network; and
while the closure member is disposed in the closed position, the body and the closure member are co-operatively configured such that fluid communication between the first outlet port and the fluid passage network is absent.

4. An assembly comprising:
a first valve apparatus including:
a body including an inlet port, a first outlet port, and a second outlet port;
a closure member configured for movement between an open position and a closed position, wherein, in the open position, the first outlet port is disposed in an open, and wherein, in the closed position, fluid flow between the closure member and the body is prevented, such the the first outlet port is disposed in a closed condition;
an upstream compartment disposed between the inlet port and the closure member;
a downstream compartment disposed between the second outlet port and the closure member;
wherein the upstream and downstream compartments are established by the positioning of the closure member relative to the body;
a closure member passage extending through the closure member for effecting fluid communication between the inlet port and the second outlet port;
a one-way valve, disposed within the closure member passage, and configured for preventing, or substantially preventing, fluid flow, through the closure member passage, from the second outlet port to the inlet port;
a first fluid pressure-receiving surface fraction defined on the closure member and configured for receiving forces being applied by fluid disposed within the upstream compartment; and
a second fluid pressure-receiving surface fraction defined on the closure member and configured for receiving forces being applied by fluid disposed within the downstream compartment;
wherein the first and second fluid pressure-receiving surface fractions are co-operatively configured such that, while the fluid pressure within the upstream compartment is equal to the fluid pressure within the downstream compartment, the closure member is biased to the closed position; and
a second valve apparatus including:
a second inlet port fluidly coupled to the second outlet port of the first valve apparatus;
an outlet port;
a discharge fluid passage extending from the second inlet port to the outlet port;
a closure member configured for movement between a closed position and an open position, wherein, in the closed position, fluid communication between the second inlet port and the outlet port is sealed or substantially sealed; and wherein, in the open position, fluid communication is effected between the second inlet port and the outlet port; and an actuator for actuating movement of the closure member from the closed position to the open position in response to a predetermined condition;

wherein the first valve apparatus and the second valve apparatus are co-operatively configured such that the closure member of the first valve apparatus moves from the closed position to the open position in response to establishment of fluid communication between the second inlet port and the outlet port of the second valve apparatus.

5. The assembly as claimed in claim 4; wherein the cross-sectional area of the first outlet port of the first valve apparatus is larger than the cross-sectional area of the outlet port of the second valve apparatus.

6. The assembly as claimed in claim 4; wherein, relative to a fluid passage of the second valve apparatus, defined by the combination of the second inlet port, the discharge fluid passage, and the outlet port of the second valve apparatus, a fluid passage of the first valve apparatus, defined by a combination of the inlet port, the closure member passage, and the second outlet port of the first valve apparatus, is configured to provide greater resistance to fluid flow.

7. The assembly as claimed in claim 4; wherein the cross-sectional area of the outlet port of the second valve apparatus is larger than the minimum cross-sectional area of the closure member passage of the first valve apparatus.

8. A system for managing gaseous material comprising: a tank including a tank outlet port that is fluidly coupled to the inlet port of the first valve apparatus of the assembly as claimed in claim 4.

9. The assembly of claim 4, wherein the closure member, the inlet port, the first outlet port, the second outlet port, and the closure member passage are co-operatively configured such that:
fluid communication is effected between the inlet port and the second outlet port via the closure member passage while the closure member is disposed in the open position and also while the closure member is disposed in the closed position.

10. The assembly of claim 4, wherein the actuator is configured for actuating movement of the closure member of the second valve apparatus from the closed position to the open position in response to a predetermined minimum temperature.

11. The assembly of claim 4, wherein fluid communication between the second inlet port and the outlet port of the second valve apparatus is effected by the discharge fluid passage.

12. The assembly as claimed in claim 4;
the body of the first valve apparatus defines a fluid passage network that extends between the inlet port, the first outlet port, and the second outlet port;
the closure member is disposed in the fluid passage network and configured for movement between the open position and the closed position while disposed in the fluid passage network; and
while the closure member is disposed in the closed position, the body and the closure member are co-operatively configured such that fluid communication between the first outlet port and the fluid passage network is absent.

13. The assembly of claim 4, wherein the one-way valve includes a check valve.

14. A kit for constructing a valve assembly comprising:
a first valve apparatus including:
a body including an inlet port, a first outlet port, and a second outlet port;
a closure member configured for movement between an open position and a closed position, wherein, in the open position, the first outlet port is disposed in an open condition, and wherein, in the closed position, fluid flow between the closure member and the body is prevented, such that the first outlet port is disposed in a closed condition;
an upstream compartment disposed between the inlet port and the closure member;
a downstream compartment disposed between the second outlet port and the closure member;
wherein the upstream and downstream compartments are established by the positioning of the closure member relative to the body;
a closure member passage extending through the closure member for effecting fluid communication between the inlet port of the first valve apparatus and the second outlet port of the first valve apparatus;
a one-way valve, disposed within the closure member passage, and configured for preventing, or substantially preventing, fluid flow, through the closure member passage, from the second outlet port of the first valve apparatus to the inlet port of the first valve apparatus;
a first fluid pressure-receiving surface fraction defined on the closure member and configured for receiving forces being applied by fluid disposed within the upstream compartment; and
a second fluid pressure-receiving surface fraction defined on the closure member and configured for receiving forces being applied by fluid disposed within the downstream compartment;
wherein the first and second fluid pressure-receiving surface fractions are co-operatively configured such that, while the fluid pressure within the upstream compartment is equal to the fluid pressure within the downstream compartment, the closure member is biased to the closed position; and
a second valve apparatus including:
a second inlet port configured for fluid coupling to the second outlet port of the first valve apparatus;
an outlet port;
a discharge fluid passage extending from the second inlet port to the outlet port;
a closure member configured for movement between a closed position and an open position, wherein, in the closed position, fluid communication between the second inlet port and the outlet port is sealed or substantially sealed; and wherein, in the open position, fluid communication is effected between the second inlet port and the outlet port; and
an actuator for actuating movement of the closure member from the closed position to the open position in response to a predetermined condition;
wherein the first valve apparatus and the second valve apparatus are co-operatively configured such that the closure member of the first valve apparatus moves from the closed position to the open position in response to establishment of fluid communication between the second inlet port and the outlet port of the second valve apparatus.

15. The kit of claim 14, wherein the closure member, the inlet port, the first outlet port, the second outlet port, and the closure member passage are co-operatively configured such that:
fluid communication is effected between the inlet port and the second outlet port via the closure member passage while the closure member is disposed in the open position and also while the closure member is disposed in the closed position.

16. The kit of claim 14, wherein the actuator is configured for actuating movement of the closure member of the second valve apparatus from the closed position to the open position in response to a predetermined minimum temperature.

17. The kit of claim 14, wherein fluid communication between the second inlet port and the outlet port of the second valve apparatus is effected by the discharge fluid passage.

18. The kit as claimed in claim 14;
the body of the first valve apparatus defines a fluid passage network that extends between the inlet port, the first outlet port, and the second outlet port;
the closure member is disposed in the fluid passage network and configured for movement between the open position and the closed position while disposed in the fluid passage network; and
while the closure member is disposed in the closed position, the body and the closure member are co-operatively configured such that fluid communication between the first outlet port and the fluid passage network is absent.

19. The kit of claim 14, wherein the one-way valve includes a check valve.

20. A valve apparatus, comprising:
a body including an inlet port, a first outlet port, and a second outlet port;
a closure member configured for movement between an open position and a closed position, wherein, in the open position, the first outlet port is disposed in an open, condition, and wherein, while the closure member is in the closed position, fluid flow between the closure member and the body is prevented, such that the first outlet port is disposed in an closed condition;
an upstream compartment disposed between the inlet port and the closure member;
a downstream compartment disposed between the second outlet port and the closure member;
wherein the upstream and downstream compartments are established by the positioning of the closure member relative to the body;
a closure member passage extending through the closure member for effecting fluid communication between the inlet port and the second outlet port;
a first fluid pressure-receiving surface fraction defined on the closure member and configured for receiving forces being applied by fluid disposed within the upstream compartment; and
a second fluid pressure-receiving surface fraction defined on the closure member and configured for receiving forces being applied by fluid disposed within the downstream compartment;
wherein:
the first and second fluid pressure-receiving surface fractions are co-operatively configured such that, while the fluid pressure within the upstream compartment is equal to the fluid pressure within the downstream compartment, the closure member is biased to the closed position exclusively by the forces being applied by the fluid disposed within the upstream compartment and the forces being applied by the fluid disposed within the downstream compartment; and
the closure member, the inlet port, the first outlet port, the second outlet port, and the closure member passage are co-operatively configured such that fluid communication is effected between the inlet port and the second outlet port via the closure member passage while the closure member is disposed in the open position and also while the closure member is disposed in the closed position.

21. The valve apparatus as claimed in claim 20, further comprising:
a one-way valve, disposed within the closure member passage, and configured for preventing, or substantially preventing, fluid flow, through the closure member passage, from the second outlet port to the inlet port.

22. The valve apparatus as claimed in claim 21;
wherein the one-way valve includes a check valve.

23. The valve apparatus as claimed in claim 20;
the body defines a fluid passage network that extends between the inlet port, the first outlet port, and the second outlet port;
the closure member is disposed in the fluid passage network and configured for movement between the open position and the closed position while disposed in the fluid passage network; and
while the closure member is disposed in the closed position, the body and the closure member are co-operatively configured such that fluid communication between the first outlet port and the fluid passage network is absent.

24. A valve apparatus comprising;
a body including an inlet port, a first outlet port, and a second outlet port;
a closure member configured for movement between an open position and a closed position;
a closure member-receiving space that is defined by the body, and configured for receiving the closure member;
a closure member passage extending through the closure member for effecting fluid communication between the inlet port and the second outlet port;
a one-way valve, disposed within the closure member passage, and configured for preventing, or substantially preventing, fluid flow, through the closure member passage, from the second outlet port to the inlet port;
a first fluid pressure-receiving surface fraction defined on the closure member and configured for receiving fluid pressure being applied by fluid disposed at the inlet port; and
a second fluid pressure-receiving surface fraction defined on the closure member and configured for receiving fluid pressure being applied by fluid disposed at the second outlet port;
wherein the total surface area of the second fluid pressure-receiving surface fraction exceeds the total surface area of the first fluid pressure-receiving surface fraction; and
wherein the body and the closure member are co-operatively configured such that:
while the closure member is in the closed position:
fluid communication between the inlet port and the second outlet port via the closure member-receiving space is present; and
fluid communication between the first outlet port and the closure member-receiving space is absent;

while the closure member is in the open position:
   fluid communication between the inlet port and the second outlet port via the closure member-receiving space is present; and
   fluid communication between the inlet port and the first outlet port via the closure member-receiving space is present.

25. The valve apparatus of claim 24, wherein the one-way valve includes a check valve.

\* \* \* \* \*